(12) United States Patent
Backlund et al.

(10) Patent No.: US 9,101,960 B2
(45) Date of Patent: Aug. 11, 2015

(54) METHOD FOR HANDLING HARD METAL

(75) Inventors: Stefan Backlund, Osthammar (SE); Ulf Jutterstrom, Stockholm (SE)

(73) Assignee: SANDVIK INTELLECTUAL PROPERTY AB, Sandviken (SE)

( * ) Notice: Subject to any disclaimer, the term of this patent is extended or adjusted under 35 U.S.C. 154(b) by 0 days.

(21) Appl. No.: 14/126,551

(22) PCT Filed: Jun. 14, 2012

(86) PCT No.: PCT/EP2012/061279
§ 371 (c)(1),
(2), (4) Date: Dec. 16, 2013

(87) PCT Pub. No.: WO2012/171993
PCT Pub. Date: Dec. 20, 2012

(65) Prior Publication Data
US 2014/0116926 A1    May 1, 2014

(30) Foreign Application Priority Data

Jun. 17, 2011   (EP) .................................... 11170382

(51) Int. Cl.
*B07C 5/02*  (2006.01)
*C22B 7/00*  (2006.01)
*B22F 3/24*  (2006.01)

(52) U.S. Cl.
CPC ... *B07C 5/02* (2013.01); *B22F 3/24* (2013.01); *C22B 7/001* (2013.01)

(58) Field of Classification Search
CPC ..................................... B07C 5/02; B07C 5/34
USPC ................................... 209/3, 3.1; 148/95, 514
See application file for complete search history.

(56) References Cited

U.S. PATENT DOCUMENTS

| | | | | | |
|---|---|---|---|---|---|
| 4,230,462 | A | * | 10/1980 | Moskowitz | 51/307 |
| 4,357,382 | A | * | 11/1982 | Lambert et al. | 428/212 |
| 4,466,945 | A | * | 8/1984 | Cheney et al. | 423/53 |
| 4,470,956 | A | * | 9/1984 | Cheney et al. | 423/53 |
| 4,772,339 | A | * | 9/1988 | Ekemar et al. | 148/514 |

FOREIGN PATENT DOCUMENTS

| | | | |
|---|---|---|---|
| GB | 1389140 A | * | 4/1975 |
| JP | 54021904 A | | 2/1979 |
| JP | H01306548 A | | 12/1989 |

* cited by examiner

*Primary Examiner* — Terrell Matthews
(74) *Attorney, Agent, or Firm* — Corinne R. Gorski

(57) ABSTRACT

A method for sorting hard metal including the steps of subjecting one or more bodies of hard metal to a heat treatment at a temperature of 500° C. or higher in an atmosphere including at least one reactive gas component prone to form a reaction product with an element that may or may not be present in the one or more bodies. A sorting operation of the one or more bodies is performed based on a presence or absence of the reaction product in a surface portion of the heat treated one or more bodies.

15 Claims, No Drawings

METHOD FOR HANDLING HARD METAL

RELATED APPLICATION DATA

This application is a §371 National Stage Application of PCT International Application No. PCT/EP2012/061279 filed Jun. 14, 2012 claiming priority of EP Application No. 11170382.3 filed Jun. 17, 2011.

The present invention relates to a method for sorting hard metal.

BACKGROUND OF THE INVENTION

Hard metal is widely used in a broad application range including cutting tools, mining tools and wear parts.

Hard metal products, such as cemented carbides and cermets, contain relatively expensive elements, and there is a strong need to recover scrap by recycling spent and unused hard metal products, both for environmental and cost reasons. There are several processes currently used to recycle hard metal products including, e.g., the zinc process and the cold stream process.

However, the hard metal often contains elements that make the recycled material unsuitable as raw material base for the manufacture of certain hard metal grades. Such elements may be for example titanium, tantalum and chromium. These elements are commonly used as property enhancing additions in a variety of cemented carbide grades. These elements are, however, for other grades unwanted or even detrimental to the properties. There exist methods for purifying the raw material, mostly of chemical nature, but these are time-consuming and costly, and often involve environmentally unfriendly process steps or chemicals.

EP 233 162 discloses a method for separating cemented carbide bodies making use of the driving force for re-distribution of a binder metal melt between hard metal bodies, in contact with or close to each other, having different mean grain size, grain size distribution, relative proportions and compositions of the hard constituent phases. There is however still a need to sort hard metal bodies with regards to the presence or absence of different elements in the hard metal.

THE INVENTION

It is an object of the present invention to reduce or eliminate the above mentioned problem. This object is achieved according to the invention by a method for sorting hard metal according to claim 1.

A method for sorting hard metal according the present invention comprises the steps:
(a) subjecting one or more bodies comprising hard metal to a heat treatment, at a temperature of 500° C. or higher, in an atmosphere comprising at least one reactive gas component prone to form a reaction product with an element that may or may not be present in the one or more bodies, and
(b) performing a sorting operation of the one or more bodies based on a presence or absence of the reaction product in a surface portion of the heat treated one or more bodies.

DETAILED EMBODIMENTS OF THE INVENTION

It has been found that the presence of a specific element in a sintered hard metal body can be detected by subjecting the sintered hard metal body to a suitable gaseous atmosphere at an elevated temperature. Under the appropriate conditions, the presence of the element in the body results in a reaction product being formed, wherein the reaction product comprises the specific element comprised in the hard metal and an element from the gaseous atmosphere. The reaction product may also include further elements from the hard metal and/or from the gaseous atmosphere. The formed reaction product, formed in the surface portion of the hard metal, affects the hard metal such that a subsequent sorting operation can be based on the character of the affected part of the hard metal. The absence of any formed reaction product during the treatment at elevated temperature may in a similar manor be used for determining the absence of a specific element in the hard metal and thus allowing for a subsequent sorting operation of such a body or bodies.

In this context a surface portion may not only include the outermost, visible surface, but can extend to a depth of 50 µm of more. The affected part may have a thickness of less than 1 µm up to several tenth of µm. Suitably the thickness of the affected part is at least 0.5 µm, but less than 50 µm. The affected part may further not necessarily include the outermost surface, but may instead be entirely located below the outermost surface, i.e., in a non-visible part of the surface portion. For reasons of detection and characterisation of the formed reaction product it is preferred that the surface portion extends to a depth of no more than 100 µm and thus the affected part is suitably at least partly located within this portion.

The present invention thus relates to a method of sorting hard metal characterised by comprising the steps:
(a) subjecting one or more bodies comprising sintered hard metal to a heat treatment in an atmosphere comprising at least one reactive gas component prone to form a reaction product with an element that may or may not be present in the one or more bodies, at a temperature of 500° C. or higher, and subsequently
(b) performing a sorting operation based on the character or appearance of a surface portion of the one or more bodies.

In one embodiment the at least one reactive gas component comprises oxygen. The oxygen can be added in the form of e.g. $O_2$, $H_2O$, CO, and/or $CO_2$. A reactive gas component comprising oxygen may suitably be used for detecting e.g. Cr in the hard metal, the reaction product thus having a composition comprising chromium and oxygen.

In another embodiment the at least one reactive gas component comprises nitrogen suitably added as nitrogen gas, $N_2$, or ammonia. The use of a reactive gas component comprising nitrogen is useful for detecting e.g. Ti in the hard metal, the reaction product thus comprising titanium and nitrogen.

In the above embodiments reactive gas components comprising oxygen and nitrogen are mentioned as suitable reactive gas components. However, other reactive gas components may be used which form detectable reaction products with one or more elements in the hard metal. Other elements in the hard metal that may suitably form a reaction product are e.g. Ta, Nb or Mo. Tests have shown that a reaction product in sufficient amount for subsequent sorting form even if the element is present in small quantities in the hard metal. For instance, under the appropriate heat treatment conditions it is possible to form a sufficient amount of reaction product even if the quantity of the element in the hard metal is as small as 0.4 weight-%.

The temperature used in the heat treating step is chosen to give a reaction product of sufficient amount within an acceptable time, whilst at the same time avoiding possible detrimental effects on the hard metal. Suitably the temperature is at least 500° C. In order to increase the reaction rate the temperature is alternatively at least 900° C. In yet another alternative the temperature is at least 1200° C., preferably at least 1300° C. The heat treatment is suitably performed at a temperature of less than 2000° C. In order to avoid unwanted reactions, such as e.g. carburization reactions, and/or for economical reasons the heat treatment temperature is suitably less than 1800° C., preferably less than 1700° C.

As is the case regarding the temperature, the time is also chosen to achieve a sufficient amount of reaction product without causing a negative effect on the hard metal. The time is suitably conducted for a time of at least 30 minutes. The time may however be as long as 16 hours, for instance if a low temperature must be chosen to avoid unwanted reaction products being formed or to avoid excessive grain growth to occur. In other cases grain growth is not a problem or may even be preferable, thus allowing for long heat treatment times in combination with a high temperature.

Another means for adapting the heat treatment is by choosing an appropriate partial pressure of the reactive gas or gases. The appropriate partial pressures of the reactive gas or gases are suitably determined using thermodynamic calculations as know in the art. A partial pressure of the at least one reactive gas component in the gas may suitably be 10 mbar or higher. The pressure may however be substantially higher, generally allowing for a shorter heat treatment time. However, in general a partial pressure of the reactive gas component of about atmospheric pressure or less is sufficient to form a reaction product within a reasonable time. A lower partial pressure of the reactive gas component may be chosen to avoid unwanted reactions, which may be desirable if several different (specific) elements are present in the hard metal. The lower pressure may thus be sufficient to achieve a reaction with one of these elements in the hard metal, but at the same time too low to result in a reaction with another of these elements. Choosing an appropriate temperature may have a similar effect.

Thus, by using e.g. thermodynamic calculations the heat treatment may be suitably designed, with respect to e.g. the pressure of the one or more reactive gases as well as any inert gas present in the atmosphere and the temperature, to detect specific elements in the hard metal, if present, to allow for a subsequent sorting operation.

Temperature, time and gas pressure(s) may thus be chosen within broad ranges. It is within the purview of the skilled artisan to choose an appropriate set of parameters and to verify that the desired result is achieved.

The method is generally applied on used or unused hard metal scrap thus the one or more bodies are, before the heat treating step (a), suitably heated from a temperature of below 200° C. up to the heat treatment temperature.

The method according to the invention is suitably applied on hard metal which is WC-based, i.e. the main hard constituents being tungsten carbide in a binder of an iron group metal, Co, Ni and/or Fe, suitably mainly Co. The hard metal may additionally contain other hard constituents such as carbides or nitrides or mixtures thereof comprising one or more of Ti, Ta and Nb. Other alloying elements may also be present in the hard metal such as e.g. Cr, Mo and/or Mn.

The method is suitably applied on hard metal bodies wherein the element optionally present in the one or more bodies is chromium. Under appropriate heat treatment conditions the presence of chromium in the hard metal results in a detectable reaction product. For example the reactive gas component may be oxygen thus forming a reaction product comprising chromium and oxygen. The reaction may for instance be formed as an outermost part of the surface portion, typically appearing as a blackish surface colour, useful for visually inspecting the heat treated hard metal body or bodies and sorting of the same. A suitable temperature range for the heat treatment is between 950 and 1100° C. and the time suitably less than 10 hours. The partial pressure of oxygen containing gas, e.g. CO, $CO_2$, etc, in the furnace atmosphere may e.g. be chosen from the range 10 to 800 mbar. It is within the purview of the skilled artisan to determine a suitable combination of time, temperature and partial pressure of the at least one reactive gas component and any other gases present in the atmosphere for the heat treatment step, for example by simple trial tests with reference bodies of know composition or by thermodynamic calculations.

The method is suitably also used for sorting hard metal bodies wherein the element optionally present in the one or more bodies is titanium. Under appropriate heat treatment conditions the presence of titanium in the hard metal results in a detectable reaction product. For example the reactive gas component may be nitrogen thus forming a reaction product comprising titanium and nitrogen. The reaction may for instance be formed as an outermost part of the surface portion, typically appearing as a yellowish surface colour, useful for visually inspecting the heat treated hard metal body or bodies and sorting of the same. A suitable temperature range for the heat treatment is between 1300 and 1700° C. and the time is suitably less than 4 hours. The partial pressure of the nitrogen containing gas, e.g. ammonia, $N_2$, etc, in the furnace atmosphere may in one alternative be chosen from the range 100 to 1100 mbar. As mentioned above it is, however, within the purview of the skilled artisan to determine a suitable combination of time, temperature and partial pressure of the at least one reactive gas component for the heat treatment step, for example by simple trial tests with reference bodies of know composition or by thermodynamic calculations.

Thus, in one embodiment of the invention the reaction product at least partly constitutes the outermost surface of the heat treated one or more bodies that contains the element.

In one embodiment the sorting operation (b) is based on a colour of the outermost surface of the one or more bodies. In this context it is an advantage if the colour is detectable by the naked eye allowing for a manual sorting operation or detectable by e.g. a visualisation system allowing for automatic sorting.

In one embodiment, the sorting operation (b) is performed by visual inspection of the character of an outermost surface portion of the one or more bodies.

In another embodiment, the sorting operation (b) is performed by automated analysis of the character of the surface portion of the one or more bodies.

In one embodiment, the hard metal body or bodies are uncoated prior to the heat treatment.

In one embodiment, the hard metal body or bodies have a coating prior to the heat treatment. The coating may e.g. be a PACVD, CVD or PVD coating. Tests have shown that such a coating does not obstruct the formation of a reaction product. Instead a coating of e.g., TiN appear to initially dissolve during the heat treatment where after a reaction product may be formed e.g. as an outermost surface of the hard metal.

In the above mainly a sorting step sorting based on a reaction product of a distinguishable colour forming the outermost surface of the hard metal has been discussed. However, as an alternative, the sorting step may be based on the composition or other specific properties of the reaction product, suitably using an automated sorting system.

It should be noted that the same gas atmosphere may give rise to different reaction products for different hard metal compositions, giving a possibility to sort a group of hard metal bodies of several hard metal grades, processed in the same single heat treatment step, into several different categories.

The method is suitable for sorting hard metal bodies of various types, sizes and shapes, for example inserts, such as inserts for cutting metal, wood, stone, etc., drills, and wear parts.

Example 1

Partly coated and uncoated samples of two different sintered hard metal compositions were subjected to a treatment according to the invention.

The hard metal compositions were according to Table 1, other elements on level of impurity. Before the heat treatment the hard metal of all the samples have a mid-grey colour.

TABLE 1

| Sample | Composition | Coating |
|---|---|---|
| a | 10 Co, 0.5 Cr, balance WC | $(Ti_{0.8}Al_{0.2})N$ |
| b | 10 Co, 0.5 Cr, balance WC | — |
| c | 11 Co, 4 Nb, 1.5 Ta, 3 Ti; balance WC | $(Al_{0.7}Cr_{0.3})N$ |
| d | 11 Co, 4 Nb, 1.5 Ta, 3 Ti; balance WC | — |

The samples a-d were subjected to a heat treatment, wherein:

Temperature: 1650° C.
Time (at 1650° C.): 60 minutes
Furnace atmosphere: atmospheric pressure, nitrogen atmosphere of
$N_2$ (flow 500 l/h)
The results after the heat treatment can be seen in Table 2.

TABLE 2

| Sample | Appearance of hard metal surface | Comment |
|---|---|---|
| a | Silver colour | No traces of coating residues |
| b | Silver colour | |
| c | Yellowish colour | No traces of coating residues |
| d | Yellowish colour | |

From Table 2 it can be concluded that the samples are clearly distinguishable from each other making a subsequent sorting operation easy using, e.g., only the naked eye. Furthermore, the process is effective in removing the hard and wear resistant coating initially present on the hard metal, which is a great advantage in subsequent recycling steps such as for example a Zn-process.

Example 2

Partly coated samples of the same two hard metal compositions as in Example 1 were subjected to a treatment at different temperatures according to the invention.

Before the heat treatment the hard metal of all the samples have a mid-grey colour.

TABLE 3

| Sample | Composition | Coating |
|---|---|---|
| e | 10 Co, 0.5 Cr, balance WC | $(Ti_{0.8}Al_{0.2})N$ |
| f | 11 Co, 4 Nb, 1.5 Ta, 3 Ti; balance WC | $(Al_{0.7}Cr_{0.3})N$ |

The samples e and f were subjected to a heat treatment, wherein:

Temperature: 1350° C., 1400° C., 1450° C., 1500° C., 1550° C., respectively
Time (at top temperature): 60 minutes
Furnace atmosphere: atmospheric pressure, nitrogen atmosphere of
$N_2$ (flow 300 l/h)
The results after the heat treatment can be seen in Table 4.

TABLE 4

| Sample | Temperature, ° C. | Appearance of hard metal surface | Comment |
|---|---|---|---|
| e | 1350 | Mid-grey colour | Coating residues |
| e | 1400 | Mid-grey colour | Some traces of coating residues |
| e | 1450 | Mid-grey colour | Minor traces of coating residues |
| e | 1500 | Silver colour | No traces of coating residues |
| e | 1550 | Silver colour | No traces of coating residues |
| f | 1350 | Yellowish colour | No traces of coating residues |
| f | 1400 | Yellowish colour | No traces of coating residues |
| f | 1450 | Yellowish colour | No traces of coating residues |
| f | 1500 | Yellowish colour | No traces of coating residues |
| f | 1550 | Yellowish colour | No traces of coating residues |

From Table 4 it can be concluded that the Samples are clearly distinguishable from each other when using a heat treatment temperature as low as 1350° C. making a subsequent sorting operation easy. The example indicates that even lower temperatures may be used. Furthermore, the process is effective in removing the hard and wear resistant coating initially present on the hard metal.

Example 3

Uncoated samples of different sintered hard metal compositions were subjected to a treatment according to the invention.

The hard metal compositions were according to Table 5, other elements on level of impurity. Before the heat treatment the hard metal of all the samples have a mid-grey colour.

TABLE 5

| Sample | Composition (wt-%) |
|---|---|
| g | 10 Co, 0.5 Cr, balance WC |
| h | 13.5 Co, 1.5 Cr, balance WC |
| i | 11 Co, 4 Nb, 1.5 Ta, 3 Ti; balance WC |
| j | 8 Co, balance WC |

The samples e and f were subjected to a heat treatment, wherein:

Temperature: 1000° C.
Time (at top temperature): 8 h
Furnace atmosphere: atmospheric pressure, oxygen containing atmosphere of
$H_2$ (flow 0.6 l/h),
$CO_2$ (flow 0.066 l/h),
CO (flow 1.9 l/h)
The results after the heat treatment can be seen in Table 6.

TABLE 6

| Sample | Appearance of hard metal surface | Comment |
|---|---|---|
| g | Dark grey colour | |
| h | Near black colour | |
| i | Mid-grey colour | No apparent colour change after heat treatment |
| j | Mid-grey colour | No apparent colour change after heat treatment |

From Table 6 it can be concluded that the chromium containing samples are clearly distinguishable from both the samples of pure WC—Co as well as samples containing Ta, Nb and Ti in addition to WC—Co, making a subsequent sorting operation easy.

The invention claimed is:

1. A method for sorting hard metal comprising the steps of:
   subjecting one or more bodies of hard metal to a heat treatment at a temperature of 500° C. or higher in an atmosphere including at least one reactive gas component;
   forming a reaction product wherein the reaction product comprises specific elements found in the one or more bodies and the at least one reactive gas component; and
   performing a sorting operation based on the character of the affected part of the one or more bodies the sorting based on a presence or absence of the reaction product in a surface portion of the heat treated one or more bodies.

2. The method according to claim 1, wherein the at least one reactive gas component is oxygen.

3. The method according to claim 1, wherein the at least one reactive gas component is nitrogen.

4. The method according to claim 1, wherein a partial pressure of the at least one reactive gas component in the gas is 10 mbar or higher.

5. The method according to claim 1, wherein the temperature is at least 900° C.

6. The method according to claim 1, wherein the temperature is less than 2000° C.

7. The method according to claim 1, wherein the heat treatment step is conducted for a time of at least 30 minutes.

8. The method according claim 1, wherein the hard metal is WC-based.

9. The method according to claim 1, wherein said one or more bodies are heated from a temperature of below 200° C. up to the heat treatment temperature prior to the heat treatment step.

10. The method according to claim 1, wherein said element present in the one or more bodies is chromium.

11. The method according to claim 1, wherein said element present in the one or more bodies is titanium.

12. The method according to claim 1, wherein said reaction product at least partly constitutes the surface portion of the heat treated one or more bodies containing said element.

13. The method according to claim 1, wherein said sorting operation is performed by visual inspection of an outermost surface of the one or more bodies.

14. The method according to claim 13, wherein said sorting operation is based on a color of the outermost surface of the one or more bodies.

15. The method according to claim 1, wherein said sorting operation is performed by automated analysis of the surface portion of the one or more bodies.

* * * * *